US012567227B2

(12) United States Patent
Zhu et al.

(10) Patent No.: US 12,567,227 B2
(45) Date of Patent: Mar. 3, 2026

(54) METHOD AND SYSTEM FOR UNSUPERVISED DEEP REPRESENTATION LEARNING BASED ON IMAGE TRANSLATION

(71) Applicant: ZHEJIANG NORMAL UNIVERSITY, Jinhua (CN)

(72) Inventors: Xinzhong Zhu, Jinhua (CN); Huiying Xu, Jinhua (CN); Xifeng Guo, Jinhua (CN); Shihao Dong, Jinhua (CN); Jianmin Zhao, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 300 days.

(21) Appl. No.: 18/274,217

(22) PCT Filed: Nov. 24, 2021

(86) PCT No.: PCT/CN2021/132631
§ 371 (c)(1),
(2) Date: Jul. 26, 2023

(87) PCT Pub. No.: WO2022/160898
PCT Pub. Date: Aug. 4, 2022

(65) Prior Publication Data
US 2024/0104885 A1     Mar. 28, 2024

(30) Foreign Application Priority Data
Jan. 29, 2021     (CN) .......................... 202110128485.2

(51) Int. Cl.
*G06V 10/44*     (2022.01)
*G06T 7/10*     (2017.01)
(Continued)

(52) U.S. Cl.
CPC ................ *G06V 10/44* (2022.01); *G06T 7/10* (2017.01); *G06V 10/82* (2022.01); *G06V 20/70* (2022.01)

(58) Field of Classification Search
CPC .... G06V 10/44; G06V 10/82; G06V 10/7753; G06V 20/70; G06T 7/10; G06T 7/41;
(Continued)

(56) References Cited

U.S. PATENT DOCUMENTS

2017/0148222 A1     5/2017   Holzer et al.
2020/0020097 A1     1/2020   Do et al.

FOREIGN PATENT DOCUMENTS

CN     109903396 A     6/2019
CN     110136136 A     8/2019
(Continued)

OTHER PUBLICATIONS

Dosovitskiy et al, Discriminative Unsupervised Feature Learning with Exemplar Convolutional Neural Networks, 2016, IEEE Translations on Pattern Analysis and Machine Intelligence, 38(9): 1734-1747. (Year: 2016).*
(Continued)

*Primary Examiner* — Kathleen M Broughton
(74) *Attorney, Agent, or Firm* — Bayramoglu Law Offices LLC

(57)     ABSTRACT
A system for unsupervised deep representation learning based on image translation is provided. The system includes an image translation transformation module used for performing a random translation transformation on an image and generating an auxiliary label; an image mask module connected with the image translation transformation module and used for applying a mask to the image after translation transformation; a deep neural network connected with the image mask module and used for predicting an actual
(Continued)

auxiliary label of the image after the mask is applied and learning the deep representation of the image; a regression loss function module connected with the deep neural network and used for updating parameters of the deep neural network based on a loss function; and a feature extraction module connected with the deep neural network and used for extracting the representation of the image.

9 Claims, 2 Drawing Sheets

(51) Int. Cl.
*G06V 10/82* (2022.01)
*G06V 20/70* (2022.01)

(58) Field of Classification Search
CPC . G06T 2207/20081; G06T 2207/20084; G06T 3/04; G06N 3/045; G06F 18/214
See application file for complete search history.

(56) References Cited

FOREIGN PATENT DOCUMENTS

| | | | |
|---|---|---|---|
| CN | 111091575 A | 5/2020 |
| CN | 111369540 A | 7/2020 |
| CN | 111489323 A | 8/2020 |
| CN | 111783986 A | 10/2020 |
| CN | 112258436 A | 1/2021 |
| CN | 112884022 A | 6/2021 |

OTHER PUBLICATIONS

Ouali et al, Autoregressive Unsupervised Image Segmentation, 2020, arXiv:2007.08247v1, pp. 1-26. (Year: 2020).*
Guo et al, Image Representation Learning by Transformation Regression, 2021, 25th International Conference on Pattern Recognition, pp. 1-9. (Year: 2021).*
Zhang et al, AET vs AED: Unsupervised Representation Learning by Auto-Encoding Transformations rather than Data, 2019, IEEE Conference on Computer Vision and Pattern Recognition, pp. 1-9. (Year: 2019).*
Kun Guo, Research on architectural style image classification based on convolutional neural network, China Excellent Master's Thesis Full-text Database—Information Technology Series, 2019, pp. 40-47, vol. 2.
Spyros Gidaris, et al., Unsupervised Representation Learning by Predicting Image Rotations, ICLR 2018, 2018, pp. 1-16.
Izhak Golan, et al., Deep Anomaly Detection Using Geometric Transformations, 32nd Conference on Neural Information Processing Systems (NeurIPS 2018), 2018, pp. 1-12.
Alex Krizhevsky, et al., ImageNet Classification with Deep Convolutional Neural Networks, pp. 1-9.
Kaiming He, et al., Deep Residual Learning for Image Recognition, CVPR, pp. 770-778.

* cited by examiner

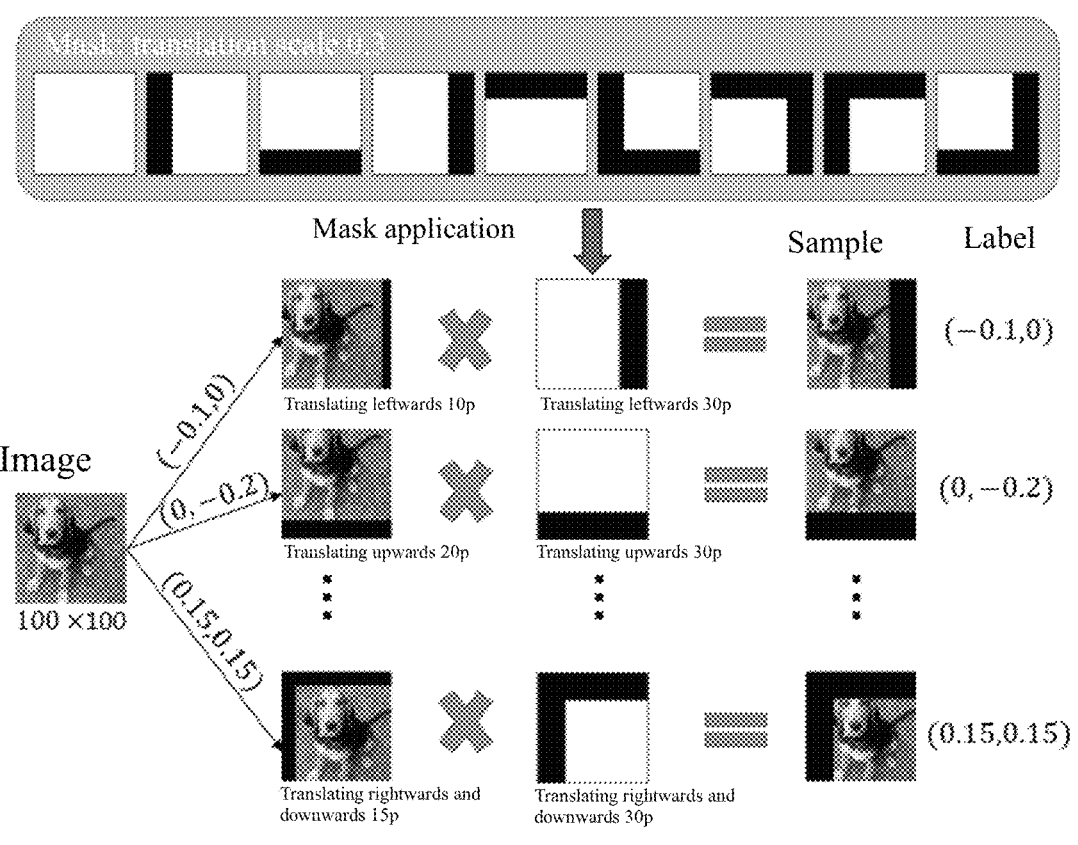

Mask application

Sample          Label

Translating leftwards 10p          Translating leftwards 30p          (−0.1,0)

Image

100 ×100

Translating upwards 20p          Translating upwards 30p          (0, −0.2)

Translating rightwards and downwards 15p          Translating rightwards and downwards 30p          (0.15,0.15)

FIG. 3

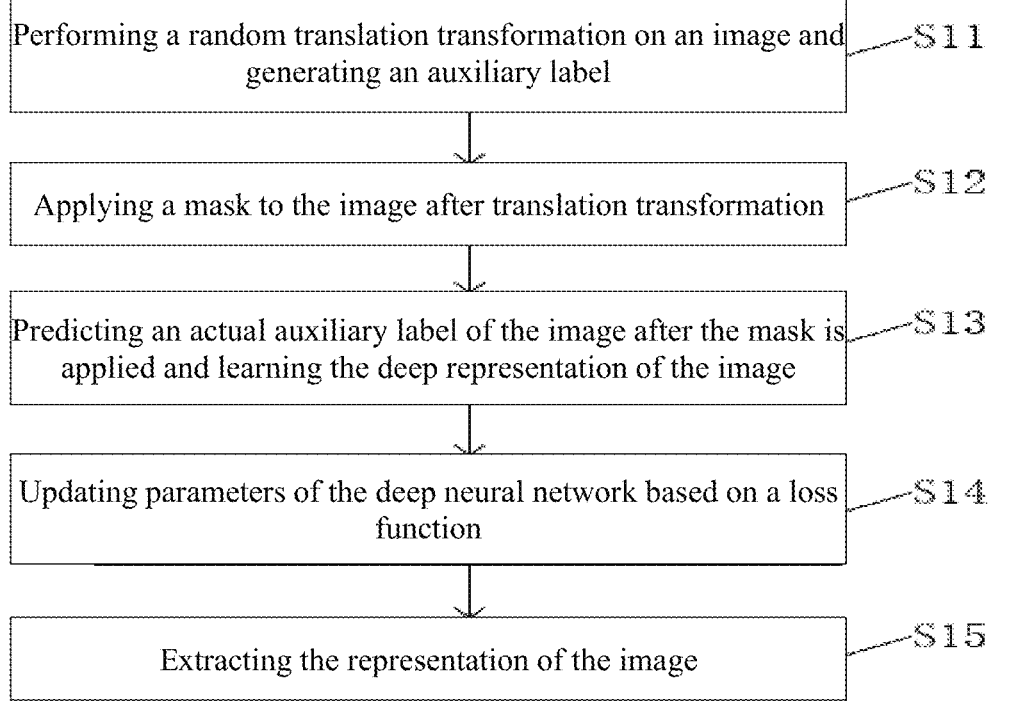

Performing a random translation transformation on an image and generating an auxiliary label — S11

Applying a mask to the image after translation transformation — S12

Predicting an actual auxiliary label of the image after the mask is applied and learning the deep representation of the image — S13

Updating parameters of the deep neural network based on a loss function — S14

Extracting the representation of the image — S15

FIG. 4

METHOD AND SYSTEM FOR UNSUPERVISED DEEP REPRESENTATION LEARNING BASED ON IMAGE TRANSLATION

CROSS REFERENCE TO THE RELATED APPLICATIONS

This application is the national phase entry of International Application No. PCT/CN2021/132631, filed on Nov. 24, 2021, which is based upon and claims priority to Chinese Patent Application No. 202110128485.2, filed on Jan. 29, 2021, the entire contents of which are incorporated herein by reference.

TECHNICAL FIELD

The present application relates to the technical field of image representation learning, in particular to a method and system for unsupervised deep representation learning based on image translation.

BACKGROUND

Deep neural networks have had a great success in machine vision tasks such as image classification, segmentation and target detection. However, a large amount of manually labeled data are required to achieve satisfactory performance. In reality, labeling data is extremely time-consuming and labor-consuming. In some fields, such as medical and aerospace, only domain experts can provide reliable labeling, and therefore it is almost impossible to collect a large amount of labeled data. As such, unsupervised learning becomes an increasingly important research direction. The unsupervised deep representation learning does not depend on artificially labeled labels as supervision information, and only uses the image data to train a deep neural network, so as to realize the purpose of learning an image representation.

An unsupervised method for predicting image rotation [Gidaris S, Singh P, Komodakis N. Unsupervised Representation Learning by Predicting Image Rotations [C]. In Proceedings of the 6th International Conference on Learning Representations (ICLR). 2018.] rotates each image by 0°, 90°, 180° and 270°, respectively, to obtain 4 rotated images, and category labels 0 to 3 are assigned to the rotated images respectively. Then, the rotated images are used for training a deep neural network by solving a four-classification task so as to achieve the purpose of learning image representation. In an unsupervised method for predicting image rotation, it is assumed that the direction of the image is determined by the direction of the most salient object in the image. However, in real life there are many symmetric objects or objects with rotational invariance, as shown in the upper half of FIG. 1, predicting the rotation direction of these objects will fail to learn meaningful feature representation.

An unsupervised method for predicting geometric transformation [Golan I, El-Yaniv R. Deep Anomaly Detection Using Geometric Transformations [C]. In Advances in Neural Information Processing Systems (NIPS). 2018: 9781-9791] performs 72 geometric transformations on each image to obtain 72 transformed images, and category labels 0 to 71 are assigned to the transformed images respectively. Then, the rotated images are used for training a deep neural network by solving a 72-classification task so as to achieve the purpose of learning image representation. The above 72 geometric transformations comprise rotation transformation of 4 angles (0°, 90°, 180° and 270°), and the permutation and combination of translation transformation and horizontal flip transformation of 9 directions (no translation, up, down, left, right, upper left, upper right, lower left, and lower right), resulting in 4×9×2=72 geometric transformations. The unsupervised method for predicting geometric transformations introduces image translation transformations to make up for the insufficiency of rotation. But the method chooses to predict the translation direction of image, that is, 9 directions including no translation, up, down, left, right, upper left, etc., as shown in the lower half of FIG. 1. Predicting the direction of translation is a very simple task due to edge effects caused by translation. The additional prediction task cannot force the neural network to explore the information of the image so that the effect of unsupervised representation learning cannot be improved.

In view of the above present situation, the present application provides a method and system for unsupervised deep representation learning based on image translation.

SUMMARY

The present application is intended to overcome the defects in the prior art and provides a method and system for unsupervised deep representation learning based on image translation, which solves the problem that an unsupervised method for predicting image rotation cannot process the rotation invariant image and also solves the problem of edge effects caused by the unsupervised method for predicting geometric transformation.

To achieve the above objective, the present application adopts the following technical solutions:

Provided is a system for unsupervised deep representation learning based on image translation, comprising:

an image translation transformation module used for performing a random translation transformation on an image and generating an auxiliary label;

an image mask module connected with the image translation transformation module and used for applying a mask to the image after translation transformation;

a deep neural network connected with the image mask module and used for predicting an actual auxiliary label of the image after the mask is applied and learning the deep representation of the image;

a regression loss function module connected with the deep neural network and used for updating parameters of the deep neural network based on a loss function; and a feature extraction module connected with the deep neural network and used for extracting the representation of the image.

Furthermore, as performing the random translation transformation on the image by the image translation transformation module, the image after translation transformation is represented as: $\mathcal{T}(x_i|t)$, wherein an image dataset $X = \{x_i \in \mathbb{R}^{C \times W \times H}\}_{i=1}^{N}$ comprising N samples is given, each image $x_i$ is represented by a matrix $C \times W \times H$, and C, W, H are the number of channels, the width and the height of the image, respectively; the image translation transformation function is represented as $\mathcal{T}(\bullet|t)$, and $t = [t_w, t_h]$ is a translation transformation parameter; $t_w \in (-1,1)$ is a horizontal translation parameter, when $t_w \geq 0$, the width scale of translating rightwards is represented as $t_w$, that is, translating rightwards $t_w*W$ pixels, and when $t_w < 0$, the width scale of translating leftwards is represented as $-t_w$, that is, translating leftwards $(-t_w*W)$ pixels; $t_h \in (-1,1)$ is the vertical translation parameter, when $t_h \geq 0$, $t_h$ represents a height scale of translating downwards, that is, translating downwards $t_h$*H pixels, and when $t_h$<0, $-t_h$ represents a height scale of translating upwards, that is, translating upwards $(-t_h$*H) pixels; and t represents an auxiliary label.

Furthermore, the mask in the image mask module is represented as:

$$\mathcal{M}_{(t)} = \mathcal{T}_{(1|T \circ \; \text{sign}(t))} = \mathcal{T}_{(1|[T_w*\text{sign}(t_w), T_h*\text{sign}}(t_h)])$$

wherein C×W×H represents a matrix C×W×H with all 1 elements; $T=[T_w, T_h]$ represents the maximum scale allowing translation transformation; $t=[t_w, t_h]$ represents performing translation transformation with an auxiliary label; and sign represents a symbolic function defined as:

$$\text{sign}(x) \begin{cases} 1, & \text{if } x > 0, \\ 0, & \text{if } x = 0, \text{ and }; \\ -1, & \text{otherwise} \end{cases}$$

the process of applying the mask to the image $\mathcal{T}(x_i|t)$ after translation transformation is $\mathcal{T}(x_i|t) \circ \mathcal{M}(t)$, that is, the image matrix after translation transformation and the mask matrix are multiplied by corresponding elements. Furthermore, the loss function in the regression loss function module is represented as:

$$\mathcal{L} = \frac{1}{N} \sum_{i=1}^{N} \|F(\mathcal{T}(x_i \mid t) \circ \mathcal{M}(t) \mid \Omega) - t\|_2^2$$

wherein F(•|Ω) represents a mapping function of the neural network; Ω represents all training parameters of the neural network; N representing the number of training samples; and $\mathcal{M}(t)$ represents the mask.

Furthermore, extracting the representation of the image by the feature extraction module are obtained by extracting a trained deep neural network.

Correspondingly, further provided is a method for unsupervised deep representation learning based on image translation, comprising:

S1, performing a random translation transformation on an image and generating an auxiliary label;

S2, applying a mask to the image after translation transformation;

S3, predicting an actual auxiliary label of the image after the mask is applied and learning the deep representation of the image;

S4, updating parameters of the deep neural network based on a loss function; and S5, extracting the representation of the image.

Furthermore, as performing the random translation transformation on the image in step S1, the image after translation transformation is represented as: $\mathcal{T}(x_i|t)$, wherein an image dataset $X=\{x_i \in \mathbb{R}^{C \times W \times H}\}_{i=1}^{N}$ comprising N samples is given, each image $x_i$ is represented by a matrix C×W×H, and C, W, H are the number of channels, the width and the height of the image, respectively; the image translation transformation function is represented as $\mathcal{T}(•|t)$, and $t=[t_w, t_h]$ is a translation transformation parameter; $t_w \in (-1,1)$ is a horizontal translation parameter, when $t_w \geq 0$, the width scale of translating rightwards is represented as $t_w$, that is, translating rightwards $t_w$*W pixels, and when $t_w$<0, the width scale of translating leftwards is represented as $-t_w$, that is, translating leftwards $(-t_w$*W) pixels; $t_h \in (-1,1)$ is the vertical translation parameter, when $t_h \geq 0$, $t_h$ represents a height scale of translating downwards, that is, translating downwards $t_h$*H pixels, and when $t_h$<0, $-t_h$ represents a height scale of translating upwards, that is, translating upwards $(-t_h$*H) pixels; and t represents an auxiliary label.

Furthermore, the mask in step S2 is represented as:

$$\mathcal{M}_{(t)} = \mathcal{T}_{(1|T \circ \; \text{sign}(t))} = \mathcal{T}_{(1|[T_w*\text{sign}(t_w), T_h*\text{sign}}(t_h)])$$

wherein C×W×H represents a matrix C×W×H with all 1 elements; $T=[T_w, T_h]$ represents the maximum scale allowing translation transformation; $t=[t_w, t_h]$ represents performing translation transformation with an auxiliary label; and sign represents a symbolic function defined as:

$$\text{sign}(x) = \begin{cases} 1, & \text{if } x > 0, \\ 0, & \text{if } x = 0, \text{ and }; \\ -1, & \text{otherwise} \end{cases}$$

the process of applying the mask to the image $\mathcal{T}(x_i|t)$ after translation transformation is $\mathcal{T}(x_i|t) \circ \mathcal{M}(t)$, that is, the image matrix after translation transformation and the mask matrix are multiplied by corresponding elements. Furthermore, the loss function in step S4 is represented as:

$$\mathcal{L} = \frac{1}{N} \sum_{i=1}^{N} \|F(\mathcal{T}(x_i \mid t) \circ \mathcal{M}(t) \mid \Omega) - t\|_2^2$$

wherein F(•|Ω) represents a mapping function of the neural network; Ω represents all training parameters of the neural network; N representing the number of training samples; and $\mathcal{M}(t)$ represents the mask.

Furthermore, extracting the representation of the image in step S5 is obtained by extracting a trained deep neural network.

Compared with the prior art, the present application provides a method for unsupervised deep representation learning based on image translation, wherein the method comprises an image translation transformation module, an image mask module, a deep neural network, a regression loss function and a feature extraction module. In the present application, through the image translation transformation module and the image mask module, the translation image dataset construction which is not affected by the edge effects can be realized, and the deep neural network is trained by the regression loss function to achieve the purpose of learning image deep representation. Experimental results on four common datasets prove that the performance of the present application is better than the existing method.

BRIEF DESCRIPTION OF THE DRAWINGS

FIG. 3 is a schematic diagram of the process of image translation and mask according to Embodiment I; and FIG. 4 is a flow chart of a method for unsupervised deep representation learning based on image translation according to Embodiment III.

DETAILED DESCRIPTION OF THE EMBODIMENTS

The embodiments of the present application are illustrated below through specific examples, and other advantages and effects of the present application can be easily understood by those skilled in the art based on the contents disclosed herein. The present application can also be implemented or applied through other different specific embodiments. Various modifications or changes to the details described in the specification can be made based on different perspectives and applications without departing from the spirit of the present application. It should be noted that, unless conflicting, the embodiments and features of the embodiments may be combined with each other.

The present application is intended to provide a method and system for unsupervised deep representation learning based on image translation to solve the problem that image representation learning is easily affected by rotational invariance and edge effects in the prior art, resulting in poor representation learning performance. Specifically, a random translation transformation is performed on an image, and the translation direction and translation scale are recorded as auxiliary labels. Furthermore, the same mask is applied to all images translated in the same direction, regardless of the translation scale, to eliminate an edge patterns generated by translation transformation. The translated and masked image and the generated auxiliary labels are used to train a deep neural network by solving the regression task so as to achieve the purpose of unsupervised learning image representation.

Embodiment I

Figure 1:
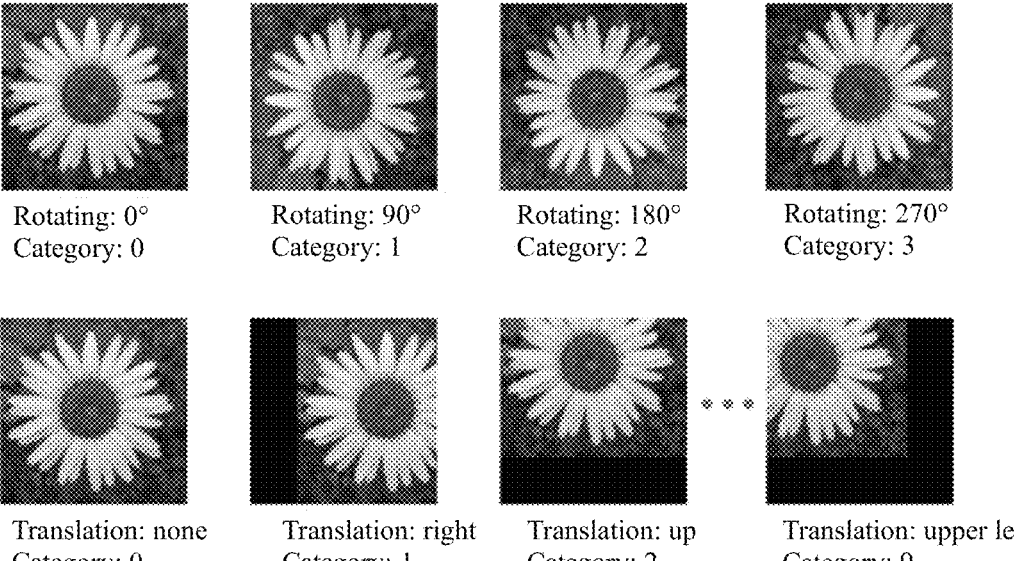
FIG. 1 is a schematic diagram of the prior art provided in the background section.
Figure 2:
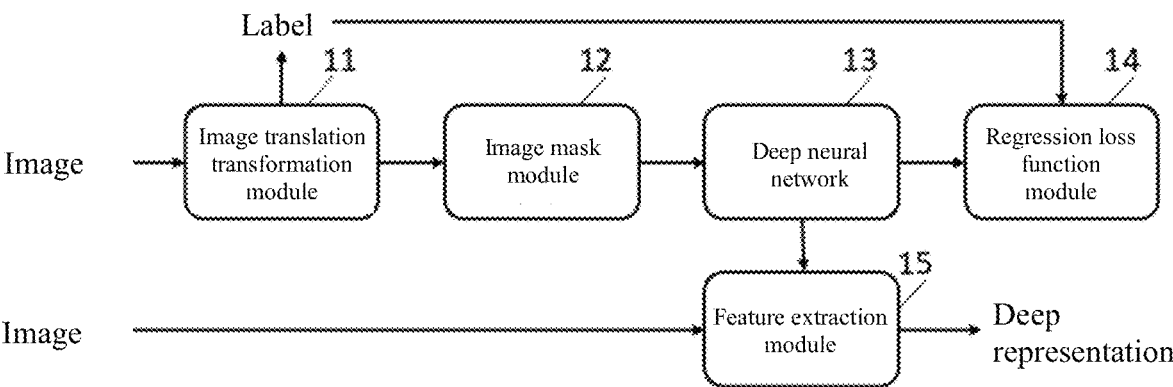
FIG. 2 is a structural diagram of a system for unsupervised deep representation learning based on image translation according to Embodiment I.

As shown in FIG. 2, a system for unsupervised deep representation learning based on image translation provided in this embodiment comprises:

an image translation transformation module 11 used for performing a random translation transformation on an image and generating an auxiliary label;

an image mask module 12 connected with the image translation transformation module 11 and used for applying a mask to the image after translation transformation;

a deep neural network 13 connected with the image mask module 12 and used for predicting an actual auxiliary label of the image after the mask is applied and learning the deep representation of the image;

a regression loss function module 14 connected with the deep neural network 13 and used for updating parameters of the deep neural network based on a loss function; and a feature extraction module 15 connected with the deep neural network 13 and used for extracting the representation of the image.

In the image translation transformation module 11, the random translation transformation is performed on the image and the auxiliary label is generated.

In this embodiment, an image dataset $X=\{x_i \in \mathbb{R}^{C \times W \times H}\}_{i=1}^{N}$ comprising N samples is given, each image $x_i$ is represented by a matrix $C \times W \times H$, and C, W, H are the number of channels, the width and the height of the image, respectively; the image translation transformation function is represented as $\mathcal{T}(\cdot|t)$, and $t=[t_w, t_h]$ is a translation transformation parameter; $t_w \in (-1,1)$ is a horizontal translation parameter, when $t_w \geq 0$, the width scale of translating rightwards is represented as $t_w$, that is, translating rightwards $t_w$*W pixels, and when $t_w < 0$, the width scale of translating leftwards is represented as $-t_w$, that is, translating leftwards $(-t_w$*W$)$ pixels; $t_h \in (-1,1)$ is the vertical translation parameter, when $t_h \geq 0$, $t_h$ represents a height scale of translating downwards, that is, translating downwards $t_h$*H pixels, and when $t_h < 0$, $-t_h$ represents a height scale of translating upwards, that is, translating upwards $(-t_h$*H$)$ pixels; and for image $\mathcal{T}(x_i|t)$ after translation transformation, $\mathcal{T}(x_i|t)$ represents an auxiliary label, also called parameter.

For example, for an RGB image $x_i$ of 3×100×100 size, $\mathcal{T}(x_i|[-0.1,0.2])$ represents the image obtained by translating the image $x_i$ 10 pixels leftwards and 20 pixels downwards, and the corresponding auxiliary label is [−0.1,0.2].

In the image mask module 12, the mask is applied to the image after translation transformation.

In this embodiment, the mask is applied to the image after translation transformation, and the edge patterns of all the images with the same translation direction are made the same, thereby eliminating the negative impact of the edge effects brought by translation transformation on the deep representation learning.

It is assumed that the amplitude of translation transformation imposed on a given image is largely determined by salient objects or sharp edge patterns. This assumption is consistent with people's intuitive feeling, since people also focus on the most salient foreground objects or edge patterns in the picture when calculating the number of translated pixels. Representation with discriminability can only be effectively learned only when the model focuses on salient objects for prediction. A mask is therefore designed to eliminate the impact of the sharp edge effects produced by translation transformation. In this way, the model of the neural network is forced to focus on salient objects and learn their representation. In order to achieve the above objective, the mask is constructed in such a manner that, for the same translation direction, the maximum scale allowing translation is used as a mask regardless of the translation scale, thereby making the edge pattern the same. C×W×H is used to represent a matrix C×W×H with all 1 elements, and $T=[T_w, T_h]$ is used to represent the maximum scale allowing translation; and for an image using a parameter $t=[t_w, t_h]$ to perform translation transformation, the mask is defined as:

$$\mathcal{M}_{(t)}=\mathcal{T}(1|T \circ \text{sign}(t))=\mathcal{T}(1|[T_w*\text{sign}(t_w), T_h*\text{sign}(t_h)])$$

wherein sign represents a symbolic function defined as:

$$\text{sign}(x) = \begin{cases} 1, & \text{if } x > 0, \\ 0, & \text{if } x = 0, \text{ and}; \\ -1, & \text{otherwise} \end{cases}$$

the process of applying the mask to the image $\mathcal{T}(x_i|t)$ after translation transformation is $\mathcal{T}(x_i|t) \circ \mathcal{M}(t)$, that is, the image matrix after translation transformation and the mask matrix are multiplied by corresponding elements.

For example, for an RGB image $x_i$ of 3×100×100 size, $\mathcal{T}(x_i|[-0.1,0.2])$ represents the image obtained by translating the image $x_i$ 10 pixels leftwards and 20 pixels downwards; and the maximum scale allowing translation is set as $T=[0.3,0.3]$, then the corresponding mask is an all −1 matrix transformed 30 elements in the lower left direction. Similarly, the image $\mathcal{T}(x_i|[-0.15,0.25])$ corresponds to the same mask. After the same mask is applied, the images $\mathcal{T}(x_i|[-0.1,0.2])$ and $\mathcal{T}(x_i|[-0.15,0.25])$ have the same edge pattern. In the subsequent training process, the neural network cannot distinguish the two images according to the edge pattern, therefore the representation of the salient objects in the image must be learned.

FIG. 3 is a schematic diagram of the intuitive process of the image translation transformation module and the image mask module.

In the deep neural network 13, the actual auxiliary label of the image after the mask is applied is predicted and the deep representation of the image is learned.

The deep neural network is generally provided with a plurality of convolutional layers, as involved in AlexNet [Krizhevsky A, Sutskever I, Hinton G E. ImageNet classification with deep convolutional neural networks [C]. In Advances in Neural Information Processing Systems (NIPS). 2012: 1097-1105.] and residual network ResNet [He K, Zhang X, Ren S, et al. Deep Residual Learning for Image Recognition [C]. In IEEE Conference on Computer Vision and Pattern Recognition (CVPR). 2016:770-778] and other literatures. The last layer of the network is a full-connected layer, the number of output neurons is 2, and the output neurons correspond to two dimensions of the auxiliary labels t respectively. The deep neural network is a main carrier for learning image representation, and each layer of the deep neural network corresponds to representation of different abstraction levels of an input image. $\Omega$ is used to represent all trainable parameters of the neural network, and $F(\cdot|\Omega)$ is used to represent the mapping function of the neural network.

In the regression loss function module 14, the parameters of the deep neural network are updated based on the loss function.

In this embodiment, the regression loss function is used to guide the updating of the parameters of the deep neural network. The regression loss function takes the output of the deep neural network and the auxiliary label as input, calculates the difference between the output of the deep neural network and the auxiliary label, and achieves the training of the neural network by minimizing the difference. The loss function is represented as:

$$\mathcal{L} = \frac{1}{N}\sum_{i=1}^{N}\|F(\mathcal{T}(x_i \mid t)\circ \mathcal{M}(t) \mid \Omega) - t\|_2^2$$

wherein $F(\cdot|\Omega)$ represents a mapping function of the neural network; $\Omega$ represents all training parameters of the neural network; N representing the number of training samples; and $\mathcal{M}(t)$ represents the mask.

In this embodiment, the regression model learns the deep representation to overcome the memory consumption caused by the fact that the existing method adopts a classification model in which the dataset needs to be copied for a plurality of times.

In the feature extraction module 15, the representation of the image is extracted. The feature extraction module is a part of the deep neural network, after the deep neural network is trained by using the regression loss function, the deep neural network learns the deep representation of the image, wherein a shallow layer (a layer close to the input image) learns the representation with higher universality, such as simple texture features; a deep layer (a layer close to the output) learns the representation with high relevance to tasks, such as features for predicting translation parameters; and the middle layer learns the representation with discriminability without losing universality. Therefore, the feature extraction module is obtained by extracting the first half structure of the trained deep neural network.

Compared with the prior art, this embodiment provides a method for unsupervised deep representation learning based on image translation, wherein the method comprises an image translation transformation module, an image mask module, a deep neural network, a regression loss function and a feature extraction module. In the present application, through the image translation transformation module and the image mask module, the translation image dataset construction which is not affected by the edge effects can be realized, and the deep neural network is trained by the regression loss function to achieve the purpose of learning image deep representation.

Embodiment II

The difference between the system for unsupervised deep representation learning based on image translation provided in this embodiment and that in Embodiment I is as follows:

This embodiment is compared with existing methods on a plurality of datasets to verify the effectiveness of the above method.

Dataset:

CIFAR10: this dataset comprises 60000 color images of 32×32 size, which are evenly distributed in 10 categories, that is, each category comprises 6000 images, wherein 50000 images are put into a training set, and the remaining 10000 images are put into a test set.

CIFAR100: similar to CIFAR10, also comprises 60000 images, which are, however, evenly distributed in 100 categories, and each category comprises 600 pictures. The number of samples in the training set and test set is also 5:1.

STL10: comprises 13000 labeled color images, wherein 5000 images are used for training, and 8000 images are used for testing. The size of the images is 96×96, the number of categories is 10, and each category comprises 1300 images. In addition, 100 thousand unlabeled images are also comprised.

Flower: this dataset comprises images of 17 categories of flowers commonly seen in the U K, and each category comprises 80 images. The training set and test set comprise 1020 and 340 images, respectively.

The statistical information of the above dataset is shown in Table 1 below:

TABLE 1

| | Total number of samples | Training set | Test set | Number of categories | Size of image |
|---|---|---|---|---|---|
| CIFAR10 | 6 w | 5 w | 1 w | 10 | 32 × 32 |
| CIFAR100 | 6 w | 5 w | 1 w | 100 | 32 × 32 |
| STL10 | 11.3 w | 10 w/5000 | 8000 | 10 | 96 × 96 |
| Flower | 1360 | 1020 | 340 | 17 | 96 × 96 |

Neural Network Structure:

The residual network ResNet50 [He K, Zhang X, Ren S, et al. Deep Residual Learning for Image Recognition [C]. In IEEE Conference on Computer Vision and Pattern Recognition (CVPR). 2016:770-778] is used as a deep neural network model. The network is composed of a front-end module, four residual blocks and an output module. For the CIFAR10 and CIFAR100 datasets, the front-end module comprises a convolutional layer, wherein the number of corresponding input channels is 3, the number of output channels is 16, the size of a convolutional kernel is 3×3, and both step length and padding are 1. For the STL10 and Flower datasets, the front-end module comprises a convolutional layer and a pooling layer. The number of input channels of the convolutional layer is 3, the number of output channels is 64, the size of the convolutional kernel is 7×7, the step length is 2, and the padding is 3. The size of the pool of the pooling layer is 3×3, and the step length is 2. The parameters of the four residual blocks remain the same for all datasets, that is, 3, 4, 6 and 3 residual units are comprised, respectively. Each residual unit is implemented as y:=x+f(x), wherein f is a residual function composed of a plurality of batch regularization layers, ReLU activation functions and convolutional layers. The outputs of the four residual blocks are denoted as "Block1" to "Block4", respectively. The output module is composed of a global average pooling layer and a full-connected layer. The size of the pool of the global average pooling layer is equal to the size of the feature map of "Block4", and a vector of length of 512×k (for the CIFAR10, CIFAR100 and Flower datasets, k=1; and for STL10 dataset, k=4) is obtained. The output dimension of the full-connected layer following the global average pooling layer is 2.

Evaluation Indexes:

After the deep neural network is trained, features are extracted from the Block3 layer, and the quality of these representations is then evaluated using a logistic regression classifier. A logistic regression model is trained on the CIFAR10, CIFAR100, STL10 and Flower datasets using an L-BFGS algorithm. The maximum number of iterations is set as 800, and the coefficient of the l2 norm penalty term is set as $\lambda=100.0/(DK)$, wherein D is a feature dimension, and K is the number of categories. For the STL10 dataset, ResNet50 is trained in an unsupervised manner using an unlabeled set with 100 thousand samples, and then the logistic regression model is trained using the training set. For other datasets, both ResNet50 and the logistic regression model are trained on the same training set. For all datasets, the reported classification precision is calculated by using a logistic regression model on the test set.

Comparison Results:

The results of comparing the unsupervised method for predicting image rotation [Gidaris S, Singh P, Komodakis N. Unsupervised Representation Learning by Predicting Image Rotations [C]. In Proceedings of the 6th International Conference on Learning Representations (ICLR). 2018.] and the unsupervised method for predicting geometric transformation [Golan I, El-Yaniv R. Deep Anomaly Detection Using Geometric Transformations [C]. In Advances in Neural Information Processing Systems (NIPS). 2018: 9781-9791.] on the four image datasets are shown in Table 2 below:

TABLE 2

| Dataset | Predicting image rotation | Predicting geometric transformation | This solution |
|---|---|---|---|
| CIFAR10 | 73.0 | 75.5 | 78.7 |
| CIFAR100 | 39.1 | 43.7 | 45.2 |
| STL10 | 71.0 | 73.3 | 78.4 |
| Flower | 51.5 | 51.5 | 61.2 |

It can be seen from Table 2 that experimental results on four common datasets prove that the performance of this embodiment is better than the existing method.

Embodiment III

As shown in FIG. 4, a method for unsupervised deep representation learning based on image translation provided in this embodiment comprises:

S11, performing a random translation transformation on an image and generating an auxiliary label;

S12, applying a mask to the image after translation transformation;

S13, predicting an actual auxiliary label of the image after the mask is applied and learning the deep representation of the image;

S14, updating parameters of the deep neural network based on a loss function; and S15, extracting the representation of the image.

Furthermore, as performing the random translation transformation on the image in step S11, the image after translation transformation is represented as: $\mathcal{T}(x_i|t)$, wherein an image dataset $X=\{x_i \in \mathbb{R}^{C \times W \times H}\}_{i=1}^{N}$ comprising N samples is given, each image $x_i$ is represented by a matrix $C \times W \times H$, and C, W, H are the number of channels, the width and the height of the image, respectively; the image translation transformation function is represented as $\mathcal{T}(\cdot|t)$, and $t=[t_w, t_h]$ is a translation transformation parameter; $t_w \in (-1,1)$ is a horizontal translation parameter, when $t_w \geq 0$, the width scale of translating rightwards is represented as $t_w$, that is, translating rightwards $t_w*W$ pixels, and when $t_w<0$, the width scale of translating leftwards is represented as $-t_w$, that is, translating leftwards $(-t_w*W)$ pixels; $t_h \in (-1,1)$ is the vertical translation parameter, when $t_h \geq 0$, $t_h$ represents a height scale of translating downwards, that is, translating downwards $t_h*H$ pixels, and when $t_h<0$, $-t_h$ represents a height scale of translating upwards, that is, translating upwards $(-t_h*H)$ pixels; and t represents an auxiliary label.

Furthermore, the mask in step S12 is represented as:

$$\mathcal{M}_{(t)}=\mathcal{T}(1|T \circ \text{sign}(t))=\mathcal{T}(1|[T_w*\text{sign}(t_w),T_h*\text{sign}(t_h)])$$

wherein $C \times W \times H$ represents a matrix $C \times W \times H$ with all 1 elements; $T=[T_w, T_h]$ represents the maximum scale allowing translation transformation; $t=[t_w, t_h]$ represents performing translation transformation with an auxiliary label; and sign represents a symbolic function defined as:

$$\text{sign}(x) = \begin{cases} 1, & \text{if } x > 0, \\ 0, & \text{if } x = 0, \text{ and}; \\ -1, & \text{otherwise} \end{cases}$$

the process of applying the mask to the image $\mathcal{T}(x_i|t)$ after translation transformation is $\mathcal{T}(x_i|t) \circ \mathcal{M}(t)$, that is, the image matrix after translation transformation and the mask matrix are multiplied by corresponding elements. Furthermore, the loss function in step S14 is represented as:

$$\mathcal{L} = \frac{1}{N}\sum_{i=1}^{N}\|F(\mathcal{T}(x_i|t) \circ \mathcal{M}(t)|\Omega) - t\|_2^2$$

wherein $F(\cdot|\Omega)$ represents a mapping function of the neural network; $\Omega$ represents all training parameters of the neural network; N representing the number of training samples; and $\mathcal{M}(t)$ represents the mask.

Furthermore, extracting the representation of the image in step S15 is obtained by extracting a trained deep neural network.

It should be noted that the method for unsupervised deep representation learning based on image translation provided in this embodiment is similar to that in Embodiment I, and is not repeated herein.

Compared with the prior art, this embodiment provides a method for unsupervised deep representation learning based on image translation, wherein the method comprises an image translation transformation module, an image mask module, a deep neural network, a regression loss function and a feature extraction module. In the present application, through the image translation transformation module and the image mask module, the translation image dataset construction which is not affected by the edge effects can be realized, and the deep neural network is trained by the regression loss function to achieve the purpose of learning image deep representation. Experimental results on four common datasets prove that the performance of the present application is better than the existing method.

It should be noted that the above description is only preferred embodiments of the present application and the principles of the employed technologies. It should be understood by those skilled in the art that the present application is not limited to the particular embodiments described herein, and those skilled in the art can make various obvious changes, rearrangements and substitutions without departing from the protection scope of the present application. Therefore, although the present application has been described in some detail by the above embodiments, it is not limited to the above embodiments, and may further include other equivalent embodiments without departing from the spirit of the present application, and the scope of the present application is determined by the scope of the appended claims.

What is claimed is:

1. A system for an unsupervised deep representation learning based on an image translation, comprising:
an image translation transformation module configured for performing a translation transformation on an image and generating an auxiliary label;
an image mask module connected with the image translation transformation module and configured for applying a mask to the image after the translation transformation;
a deep neural network connected with the image mask module and configured for predicting an actual auxiliary label of the image after the mask is applied and learning a deep representation of the image;
a regression loss function module connected with the deep neural network and configured for updating parameters of the deep neural network based on a loss function; and
a feature extraction module connected with the deep neural network and configured for extracting the deep representation of the image.

2. The system for the unsupervised deep representation learning based on the image translation according to claim 1, wherein as performing the translation transformation on the image by the image translation transformation module, the image after the translation transformation is represented as: $\mathcal{T}(x_i|t)$,
wherein an image dataset $X=\{x_i \in \mathbb{R}^{C \times W \times H}\}_{i=1}^{N}$ comprising N samples is given, each image $x_i$ is represented by a matrix $C \times W \times H$, and C, W, H are a number of channels, a width of the image, and a height of the image, respectively; an image translation transformation function is represented as $\mathcal{T}(\cdot|t)$, and $t=[t_w, t_h]$ is a translation transformation parameter; $t_w \in (-1,1)$ is a horizontal translation parameter, when $t_w \geq 0$, a width scale of translating rightwards is represented as the $t_w$, that is, translating rightwards $t_w$*W pixels, and when $t_w < 0$, a width scale of translating leftwards is represented as $-t_w$, that is, translating leftwards $(-t_w$*W) pixels; $t_h \in (-1,1)$ is a vertical translation parameter, when $t_h \geq 0$, $t_h$ represents a height scale of translating downwards, that is, translating downwards $t_h$*H pixels, and when $t_h < 0$, $-t_h$ represents a height scale of translating upwards, that is, translating upwards $(-t_h$*H) pixels; and t represents the auxiliary label.

3. The system for the unsupervised deep representation learning based on the image translation according to claim 2, wherein the mask in the image mask module is represented as:

$$\mathcal{M}(t) = \mathcal{T}(1|T \circ \text{sign}(t)) = \mathcal{T}(1|[T_w*\text{sign}(t_w), T_h*\text{sign}(t_h)])$$

wherein C×W×H represents a matrix C×W×H with all 1 elements; $T=[T_w, T_h]$ represents a maximum scale allowing the translation transformation; $t=[t_w, t_h]$ represents performing the translation transformation with the auxiliary label; and sign represents a symbolic function defined as:
a process of applying the mask to the image $\mathcal{T}(x_i|t)$ after the translation transformation is $\mathcal{T}(x_i|t) \circ \mathcal{M}(t)$, that is, an image matrix after the translation transformation and a mask matrix are multiplied by corresponding elements.

4. The system for the unsupervised deep representation learning based on the image translation according to claim 3, wherein the loss function in the regression loss function module is represented as:

$$\mathcal{L} = \frac{1}{N} \sum_{i=1}^{N} \|F(\mathcal{T}(x_i \mid t) \circ \mathcal{M}(t) \mid \Omega) - t\|_2^2$$

wherein $F(\cdot|\Omega)$ represents a mapping function of the deep neural network; $\Omega$ represents all training parameters of the deep neural network; N represents a number of training samples; and $\mathcal{M}(t)$ represents the mask.

5. The system for the unsupervised deep representation learning based on the image translation of claim 4, wherein extracting the deep representation of the image by the feature extraction module is obtained by extracting a trained deep neural network.

6. A method for an unsupervised deep representation learning based on an image translation, comprising:
S1, performing a translation transformation on an image and generating an auxiliary label;
S2, applying a mask to the image after the translation transformation;
S3, predicting an actual auxiliary label of the image after the mask is applied and learning a deep representation of the image;
S4, updating parameters of a deep neural network based on a loss function; and
S5, extracting the deep representation of the image;
wherein as performing the translation transformation on the image in step S1, the image after the translation transformation is represented as: $\mathcal{T}(x_i|t)$,
wherein an image dataset $X=\{x_i \in \mathbb{R}^{C \times W \times H}\}_{i=1}^{N}$ comprising N samples is given, each image $x_i$ is represented by a matrix C×W×H, and C, W, H are a number of channels, a width of the image, and a height of the image, respectively; an image translation transformation function is represented as $\mathcal{T}(\bullet|t)$, and $t=[t_w, t_h]$ is a translation transformation parameter; $t_w \in (-1,1)$ is a horizontal translation parameter, when $t_w \geq 0$, a width scale of translating rightwards is represented as $t_w$, that is, translating rightwards $t_w * W$ pixels, and when $t_w < 0$, a width scale of translating leftwards is represented as $-t_w$, that is, translating leftwards $(-t_w * W)$ pixels; $t_h \in (-1,1)$ is a vertical translation parameter, when $t_h \geq 0$, $t_h$ represents a height scale of translating downwards, that is, translating downwards $t_h * H$ pixels, and when $t_h < 0$, $-t_h$ represents a height scale of translating upwards, that is, translating upwards $(-t_h * H)$ pixels; and t represents the auxiliary label.

7. The method for the unsupervised deep representation learning based on the image translation according to claim 6, wherein the mask in step S2 is represented as:

$$\mathcal{M}(t) = \mathcal{T}(1|T \circ \operatorname{sign}(t)) = \mathcal{T}(1|[T_w * \operatorname{sign}(t_w), T_h * \operatorname{sign}(t_h)])$$

wherein C×W×H represents a matrix C×W×H with all 1 elements; $T=[T_w, T_h]$ represents a maximum scale allowing the translation transformation; $t=[t_w, t_h]$ represents performing the translation transformation with the auxiliary label; and sign represents a symbolic function defined as:

a process of applying the mask to the image $\mathcal{T}(x_i|t)$ after the translation transformation is $\mathcal{T}(x_i|t) \circ \mathcal{M}(t)$, that is, an image matrix after the translation transformation and a mask matrix are multiplied by corresponding elements.

8. The method for the unsupervised deep representation learning based on the image translation according to claim 7, wherein the loss function in step S4 is represented as:

$$\mathcal{L} = \frac{1}{N} \sum_{i=1}^{N} \|F(\mathcal{T}(x_i \mid t) \circ \mathcal{M}(t) \mid \Omega) - t\|_2^2$$

wherein $F(\bullet|\Omega)$ represents a mapping function of the deep neural network; $\Omega$ represents all training parameters of the deep neural network; N represents a number of training samples; and $\mathcal{M}(t)$ represents the mask.

9. The method for the unsupervised deep representation learning based on the image translation of claim 8, wherein extracting the deep representation of the image in step S5 is obtained by extracting a trained deep neural network.

\* \* \* \* \*